(12) United States Patent
Lettington

(10) Patent No.: US 7,067,798 B2
(45) Date of Patent: Jun. 27, 2006

(54) MULTIPLE DRUM APPARATUS FOR HIGH SPEED SCANNING OF MICROWAVE, MM-WAVE AND INFRARED RADIATION

(75) Inventor: Alan H. Lettington, Berkshire (GB)

(73) Assignee: Farran Technology Limited, Cork (IE)

( * ) Notice: Subject to any disclaimer, the term of this patent is extended or adjusted under 35 U.S.C. 154(b) by 232 days.

(21) Appl. No.: 10/765,412

(22) Filed: Jan. 26, 2004

(65) Prior Publication Data
US 2004/0164246 A1 Aug. 26, 2004

(30) Foreign Application Priority Data
Jul. 28, 2001 (GB) ................................. 0118242

(51) Int. Cl.
*H01J 3/14* (2006.01)
(52) U.S. Cl. ...................... 250/235; 250/239
(58) Field of Classification Search ................ 250/235, 250/239
See application file for complete search history.

(56) References Cited

U.S. PATENT DOCUMENTS

| | | | |
|---|---|---|---|
| 2,070,460 A | 2/1937 | Traub | |
| 4,037,920 A | 7/1977 | Runciman et al. | |
| 4,486,662 A * | 12/1984 | Abel | ............................ 250/334 |
| 4,487,473 A | 12/1984 | Hatch | |
| 5,198,919 A | 3/1993 | Reeder | |

OTHER PUBLICATIONS

Lettinton A H et al: Opto-Mechanical Scanners for Passive Millimeter-Wave Imaging Proceedings of the SPIE, SPIE, Bellingham, VA US, vol. 4032, Apr. 2000 pp. 74-80.

* cited by examiner

*Primary Examiner*—Que T. Le
(74) *Attorney, Agent, or Firm*—Clifford A. Poff

(57) ABSTRACT

Scanning apparatus operable for radiaton comprises a hollow polygonal primary drum rotatable about a central axis to present a plurality of internally presented sides or facets capable of reflecting the radiation concerned. A fixed Mangin mirror mounted within the primary drum directs such radiation onto the internally presented sides or facets of the primary drum to be reflected therefrom onto a rotating reflective faceted secondary drum. The secondary drum reflects the radiation onto a radiation receiver or sensor. The secondary drum is arranged to be rotated about an axis parallel with the rotary axis of the primary drum, in synchronism with the latter, in such a way that, over each line scanning period, radiation from substantially all of the respective facet of the primary drum can reach the receiver or sensor via the secondary drum.

10 Claims, 4 Drawing Sheets

US 7,067,798 B2

MULTIPLE DRUM APPARATUS FOR HIGH SPEED SCANNING OF MICROWAVE, MM-WAVE AND INFRARED RADIATION

TITLE OF THE INVENTION

Multiple drum apparatus for high speed scanning of microwave, mm-wave and infrared radiation

BACKGROUND OF THE INVENTION

Field of the Invention

The present invention relates to a scanning apparatus operable in the infrared, mm-wave or microwave ranges of electromagnetic radiation.

It is an object of the present invention to provide an improved scanning apparatus operable with radiation of the wavelengths indicated, having a large effective aperture and which is able to repeatedly scan, at a high rate, a two-dimensional (e.g. altitude and azimuth) field of view, and which yet can be constructed at reasonably low expense.

In infra-red imaging systems use is frequently made of flapping mirrors and rotary polygons with reflective surfaces to scan the scene. In these infra red systems the pupil in the scanner is typically 10 mm in diameter. In mm-wave or microwave systems however the apertures to be scanned are frequently 1 m or larger in diameter and the use of large flapping mirrors at high scan rates (e.g. such as to provide 10 field scans or "frames" per second or more) is not practical in these systems. It is known that tilted rotary disks may be used to scan large apertures but these produce a conical scan pattern or a linear scan with a large amount of pupil wander.

SUMMARY OF THE INVENTION

In accordance with the present invention, there is provided scanning apparatus operable in the microwave, mm-wave and infrared ranges and comprising a support structure, a primary drum which is mounted in said support structure for rotation relative to the support structure about a central axis of the primary drum, said primary drum being hollow and internally of regular polygonal form to provide a plurality of internally presented sides or facets, which are capable of reflecting the radiation concerned, a radiation director such radiation emanating from a field of view of the apparatus, being a field of view which is fixed with respect to said supporting structure, (as opposed to rotating with the primary drum), onto the internally presented sides or facets of the primary drum, such that in each of a succession of line scanning periods, as herein defined, radiation emanating from part of said field of view is directed onto a said reflective side or facet of the primary drum to be reflected therefrom onto a further receiving assembly comprising a rotating faceted reflector, herein referred to as a secondary drum, arranged to reflect the radiation striking it from the first drum onto a radiation receiver or sensor, the apparatus being so arranged that the radiation from said field of view is focused onto said radiation receiver or sensor and wherein said secondary drum is arranged to be rotated, about an axis parallel with the rotary axis of the primary drum, in synchronism with the latter, in such a way that, over said scanning period, radiation from substantially all of a respective said facet of the primary drum, or from substantially all of a predetermined region of such facet, can reach said receiver or sensor via said secondary drum.

The present invention makes it possible to manufacture a system for providing multiple linear scans, in a compact arrangement that is suitable for use in high-speed mm-wave and microwave applications.

BRIEF DESCRIPTION OF THE SEVERAL VIEWS OF THE DRAWINGS

Embodiments of the invention are described below with reference to the accompanying schematic drawings in which.

DETAILED DESCRIPTION OF THE INVENTION

Figure 1:
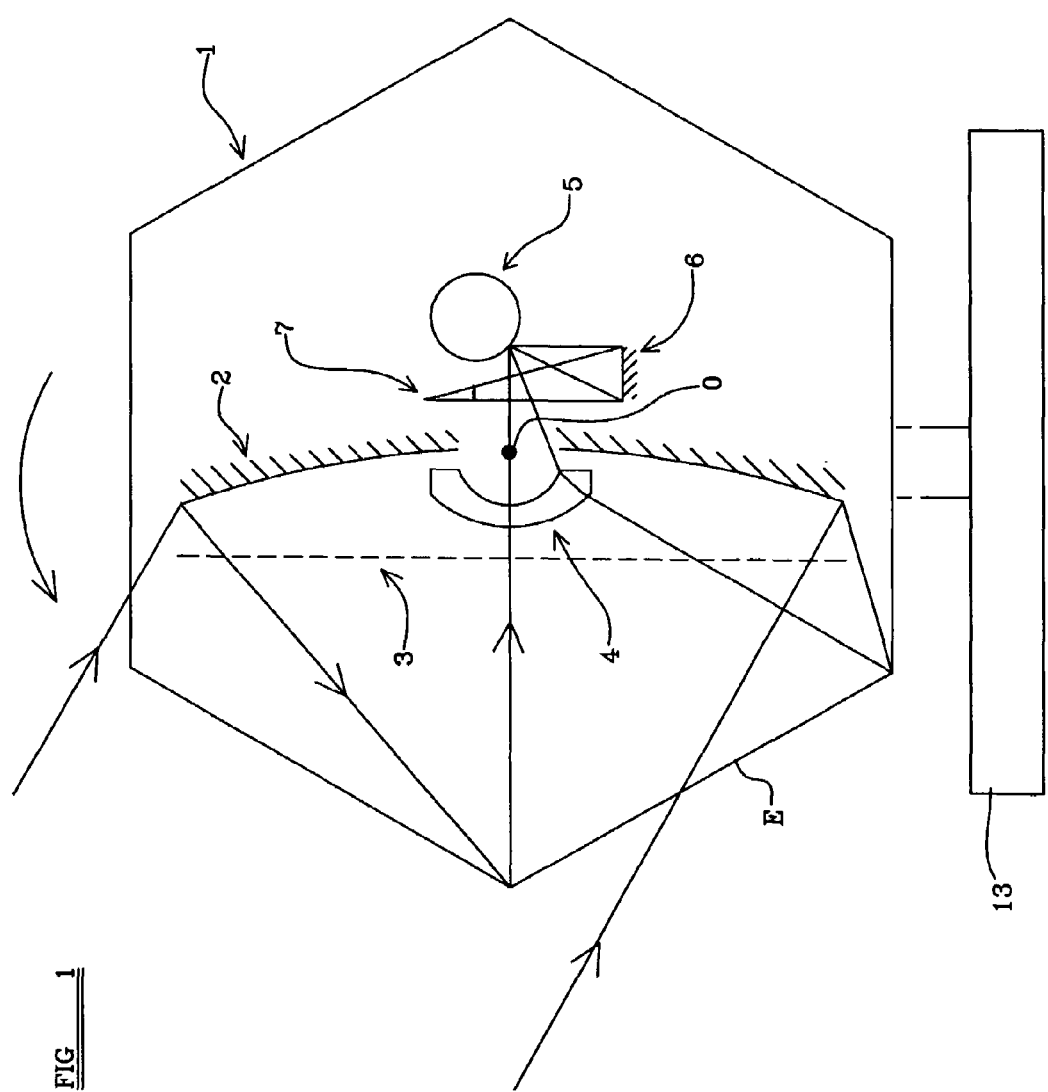
FIG. 1 is a plan view representing part of a first embodiment of the invention.

In the embodiments of the invention described below, the apparatus in each case, uses two rotating components, mounted for rotation in a fixed support structure which is not shown in the drawings. The first component consists of a primary drum in the form of a hollow regular polygon with reflective faces (also referred to herein as facets), or with polarising faces that are used in a twist reflector configuration. This first component is used in conjunction with an optically powered element such as a lens, concave mirror or Mangin mirror to scan the scene. This optically powered element may be stationary or mounted on the faces of the primary drum. In the preferred embodiments, each face of the primary drum or hollow polygon is inclined to the axis of rotation of the polygon at a different angle to the other faces. This provides a scan in a direction orthogonal to that achieved by the rotation of the primary drum or hollow polygon, the scan in the direction achieved by such rotation being herein referred to as a "line scan".

The radiation is reflected from the inside of the hollow polygon to a further receiving assembly, which derives an image signal, (typically an electrical signal), from the scanning and which can be passed to an image-forming means to form an image of scene scanned, on, for example, a CRT display, video monitor or the like, or passed to a computer for analysis or enhancement. In the embodiments to be described, during each "line scan" a respective one of the facets or sides of the primary drum directs radiation reflected therefrom towards a focus which is located on an axis fixed with respect to that particular facet and generally normal to that facet and which axis is thus located on a diameter through the rotary axis of the drum or at least lies in a plane containing the rotary axis of the drum. Such axis of each facet thus rotates with the primary drum. The further receiving assembly receives the radiation reflected from each facet in turn and generates a corresponding electrical signal. Thus, for the major part of each "line scan", the respective primary drum facet is, in effect, in full view of the further receiving assembly. (As will become evident from the discussion below, it is actually the further receiving assembly which defines the afore-mentioned axis of each facet of the primary drum, rather than the facets themselves).

The second rotating component forms part of the further receiving assembly. The radiation reflected from the primary drum passes directly or via relay optics to the second rotating component, (which is used, inter alia to control the pupil of the scanning apparatus). As noted above, the direction of the facet axis passing through the axis of rotation of the primary drum or polygon varies as the hollow primary drum or polygon rotates. It is a function of the second rotating component to re-direct the radiation reflected from the respective facet of the primary drum and converging towards the facet axis, so as to ensure that throughout the respective line scan, as the primary drum or hollow polygon rotates, such radiation reaches a fixed radiation receiver or sensor forming part of the further receiving assembly and furthermore reaches that receiver from substantially the same direction, relative to the receiver, so as to minimise variations in signal strength due to receiver directionality.

This second rotating component is in the form of a polygon with reflective or transmissive faces. This second polygon rotates in synchronism with the primary drum about an axis parallel with the rotary axis of the primary drum, or more precisely, rotates at an angular rate which is an integral multiple of the angular rate of rotation of the primary drum.

A first embodiment of this invention is illustrated in FIG. 1. As shown in FIG. 1, the primary drum or polygon 1 is supported in a support structure indicated schematically at 13 for rotation about an axis O through the centre of the drum. The faces of the polygon consist of flat sheets of wire grid polariser that preferably transmit radiation having either vertical or horizontal polarisation, (regarding the axis O as being vertical). Radiation from the scene (field of view) and having the correct polarisation passes through the sides of the polygon and falls onto a stationary concave mirror 2, which reflects the radiation onto one facet (reference E, FIG. 1) of the drum and which also causes the radiation to converge towards a focus. The mirror 2 is ideally a Mangin mirror to achieve good off-axis performance. The polarisation of the radiation reflected from the concave mirror 2 has been rotated by 90° (as explained below) when it arrives back at the face E of the polygon 1 where it is now reflected back towards mirror 2. This reflected radiation, converging towards a focus near the centre of the concave mirror, passes through a diverging lens, such as a meniscus lens 4, before it reaches the last-mentioned focus, and then passes through a hole in the centre of the mirror 2, to the second rotating component, at some distance behind the mirror 2.

The 90° rotation of the direction of polarisation of the radiation may be achieved by placing a free-standing Faraday rotator 3 in front of the mirror such that on each passage of the radiation through the rotator the direction of polarisation is rotated through 45°. Alternatively a quarter wave plate may be used in front of the concave mirror 2. In yet another configuration, the metallic surface of the mirror may be profiled to produce a 90° rotation of the direction of polarisation on reflection.

Figure 2:
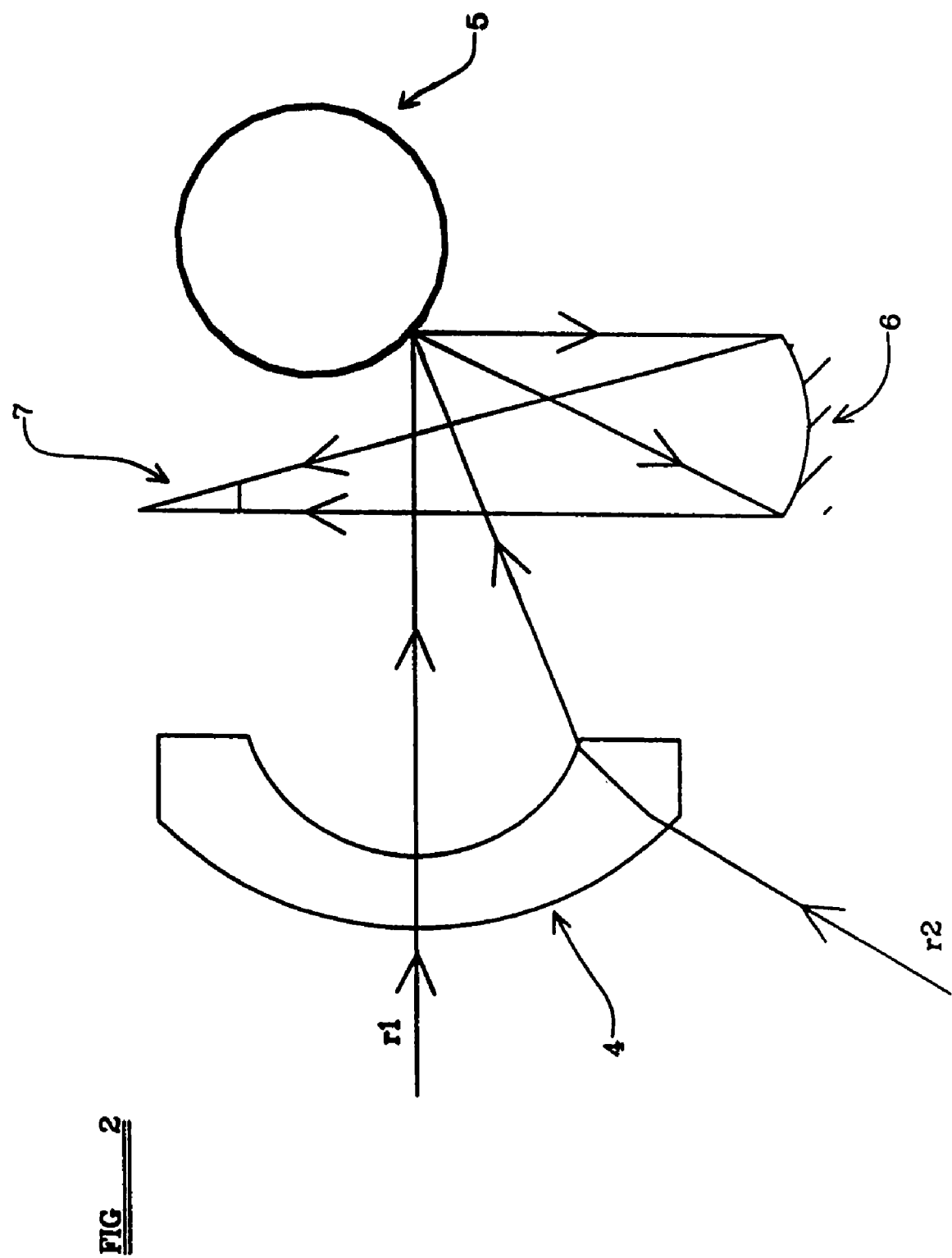
FIG. 2 is a plan view, to a larger scale, of a detail in FIG. 1.

FIG. 2 shows to a larger scale the radiation passing through the meniscus lens 4 to strike the secondary rotating component, in the form of a polygon 5 having outwardly presented reflective faces or facets defining the sides of the polygon 5. The polygon 5 is mounted for rotation in said fixed structure for rotation about an axis P parallel with the axis O, and is rotated in the same rotational sense as the polygon 1. The radiation reflected from this secondary polygon may fall directly onto a fixed radiation receiver or sensor 7 or may, (as shown), be relayed by a further optical component such as a concave mirror 6 onto the receiver 7. The lens 4 displaces the focal point of the mirror 2/facet E combination to a position some distance behind the concave mirror 2 in order to provide space to accommodate the secondary drum 5 and receiver 7. The meniscus lens illustrated also reduces, by a factor of two, the rate at which the axis onto which the radiation converges swings around relative to the stationary support structure as the primary drum rotates. That is to say, if, in FIG. 2, $r_1$ represents the ray passing along the respective primary drum facet axes at time $t_1$ and $r_2$ represents the ray passing along the axis of the same facet of the primary drum at time $t_2$ later than $t_1$ and the angle, relative to the fixed support structure, between $r_1$ and $r_2$ immediately before passing through the lens 4 is $\alpha$, the corresponding angle between rays $r_1$ and $r_2$ after passing through the lens 4 is $\alpha/2$. Consequently, whereas if the lens 4 were omitted, the secondary drum would have to rotate at half the angular rate of the primary drum to maintain a constant direction (relative to the fixed structure) of the axial ray $r_1$ $r_2$ reflected from the secondary drum 5, and would have to have twice as many facets as the primary drum, (in order to ensure that a geometrically similar relative positioning of the primary and secondary drums was achieved every time that the primary drum rotated through the angle necessary to move one face of the primary drum into the position previously occupied by an adjacent face), with the lens 4 as described, the secondary polygon is arranged to rotate at one quarter of the speed of the primary polygon and has four times as many faces. Thus, in this case, if the primary polygon has six faces, as illustrated, the secondary polygon 5 will have 24 faces.

In an alternative arrangement, the curved surfaces of the meniscus lens may be centred on the central, rotary axis of the primary drum 1, so that the meniscus lens does not change the rate at which the ray reflected from the respective primary drum facet swings as the primary drum rotates, but still displaces the focal point further behind the concave mirror 2, to allow room to accommodate the further receiver assembly 5,6,7. In this case, the secondary polygon 5 rotates at one half of the speed of the primary polygon and has twice as many faces.

The faces of the rotating polygon 1 are variously inclined with respect to the axis of rotation O, so that the receiver 7 effectively "sees" during each line scan (i.e. during each 60° rotation of drum 1), a horizontal band of the field of view at a different elevation from that "seen" in adjacent line scans, (assuming the rotational axis of polygon 1 to be vertical in FIGS. 1 and 2).

Preferably, successive faces of the primary polygon (around the circumference of the latter), are progressively inclined to the axis O so that a first face might be parallel with axis O, the second face inclined at 2° to axis O, the third at 4° to axis O and so on, with the sixth being inclined at 12° at axis O. As a result, the apparatus can generate a conventional, TV-type scanning raster as the drum 1 rotates. The faces of the secondary polygon 5 are correspondingly inclined to remove any deviation of the beam arriving at the receiver 7, i.e. so as to ensure that, despite such variations in inclination of the faces of the first polygon 1, the beam of radiation arriving at receiver 7 does so with a fixed orientation.

The regions of the secondary polygon 5 where adjacent faces meet may be blackened so as to provide a reference temperature for calibration purposes.

Whilst it is preferred to minimise the number of (expensive) receivers 7 required to achieve vertical scanning, (i.e. in a direction orthogonal to the line scan), by variation in the angle of inclination of the facets of drum 1 relative to its rotary axis O, the picture information for each line of the scanned image may instead be provided by a respective receiver 7 in a vertical array of such receivers, each receiving radiation from a respective elevation in the field of view relative to fixed structure, (again assuming the apparatus to be arranged so that the rotational axis O of polygon 1 is vertical).

Preferably a combination of these two approaches is adopted, using an array of a limited number of vertically spaced receivers 7, each receiving a few (preferably adjacent) lines of the image, with the respective parts of the image "seen" by the different receivers being combined electronically to produce the full "video" picture.

Figure 3:
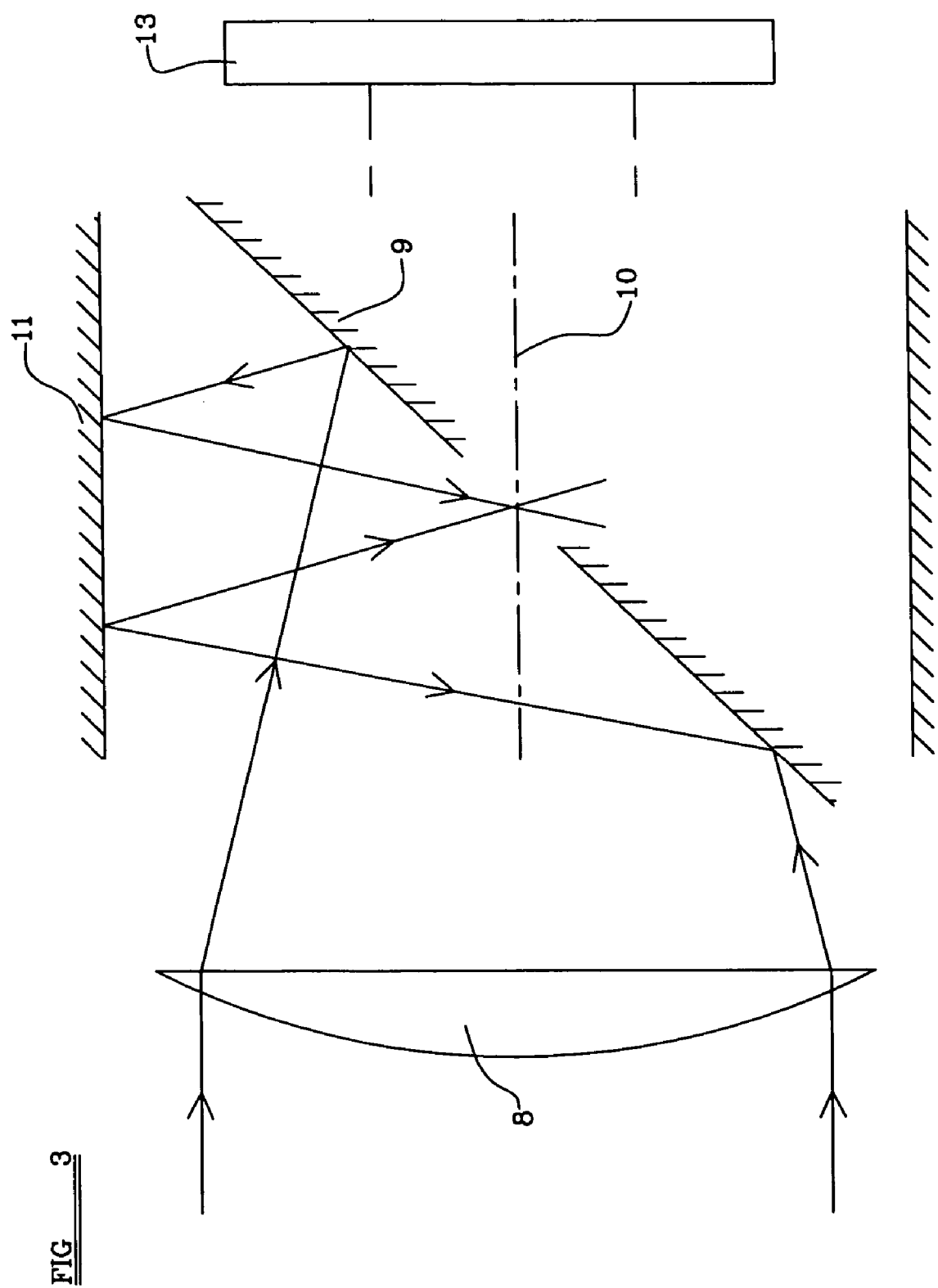
FIG. 3 is a sectional view representing part of a second embodiment.

Referring to FIG. 3, in a second embodiment of this invention, the hollow rotary primary drum or polygon, (referenced 11), is located so that its central, axis 10 of rotation relative to fixed support structure 13 points directly towards the centre of the field of view of the apparatus, and a fixed mirror 9, mounted within the hollow rotating primary drum, is inclined at 45° with respect to said axis, so as to reflect, onto the reflecting facets of the primary drum 11, radiation entering the drum, from the field of view, from an open end of the drum. As before, such radiation is focused by an optical element, which in FIG. 3 is a fixed focusing lens 8 which is mounted within the primary drum and which is located between the open end of the drum and the mirror 9. The axis of the lens 8 is roughly parallel to the axis 10 about which the primary polygon or drum 11 rotates.

The fixed focusing lens 8, like the concave mirror 2 in the embodiment of FIGS. 1 and 2, converges the incoming radiation towards a focus. This converging radiation is reflected from the fixed plane mirror 9 onto that one of the reflective inwardly directed faces of the primary drum or polygon 11 which is currently suitably positioned with respect to the mirror 10. Radiation reflected from this face of the primary drum or polygon passes through a hole in the centre of plane mirror 9 and is directed towards a focus close to the axis of rotation 10. In the same way as in the embodiment of FIGS. 1 and 2, before reaching the focus the radiation is relayed by a meniscus lens, (not shown in FIG. 3) onto a reflective secondary drum or polygon (not shown in FIG. 3), from whence it is reflected to the receivers (not shown in FIG. 3), all substantially as described in relation to FIGS. 1 and 2. The secondary drum is again rotated about an axis parallel with the rotary axis of the primary drum, in this case the axis 11, and is rotated in the same rotational sense as the primary polygon. The reflective faces of the primary polygon 11 and the secondary polygon may be inclined with respect to their axes of rotation as in the first embodiment, to achieve scanning in the direction orthogonal to the line scan direction as the drum 11 rotates.

Figure 4:
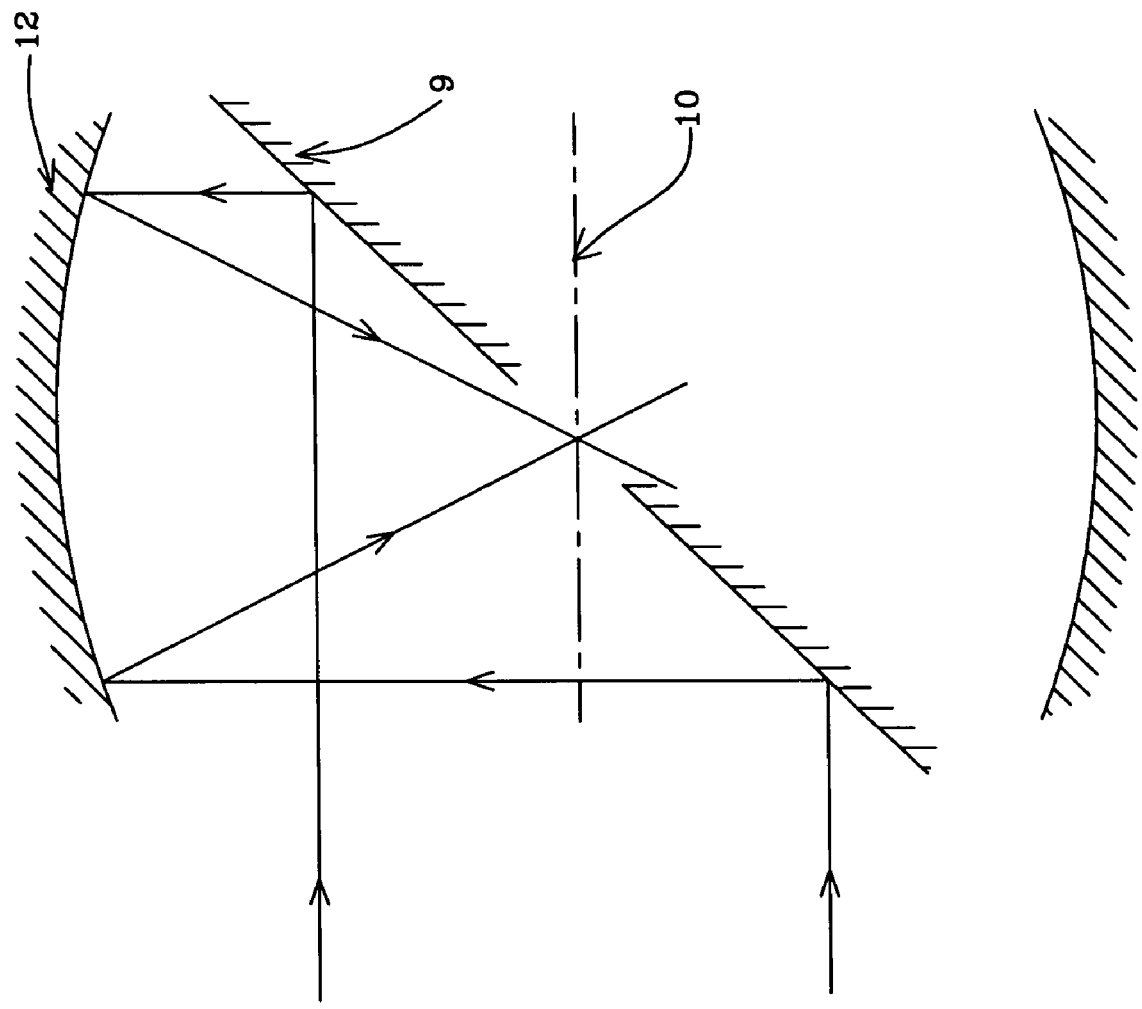
FIG. 4 is a sectional view representing part of a third embodiment.

In yet another embodiment, illustrated in FIG. 4, the rotary hollow primary drum or polygon is again located so that its central, rotary axis 10 points directly towards the centre of the field of view of the apparatus, and a fixed mirror 9, inclined at 45° with respect to said axis, is again mounted within the hollow rotating primary drum, so as to reflect, onto the reflecting faces of the primary drum, radiation entering the drum, from the field of view, from an open end of the drum. Again, the fixed mirror 9 reflects the incoming radiation onto whichever of the reflective faces of the primary drum is temporarily in the right position to receive such reflected radiation and the reflective face in question, as before, reflects that radiation back towards the fixed mirror. In the embodiment illustrated in FIG. 4, the reflective faces or "facets" of the primary drum or polygon are concave reflectors or "mirrors" 12 which are used to focus the radiation from the scene/field-of-view towards a position close to the axis of rotation 10 of the primary polygon as illustrated in FIG. 4, but, as in the preceding embodiments, this radiation passes, eg. via a meniscus lens, (not shown), through a central hole in the mirror 9, and onto a further receiving assembly (not shown) of the same form as that described with reference to FIGS. 1 and 2, and thus comprising a similarly arranged secondary drum or polygon (again rotating about an axis parallel with axis 10 and in the same rotational sense as the primary polygon), and radiation receiver or array of such receivers.

In the drawings, the angles through which the light beams are shown as being reflected are significantly exaggerated for purposes of illustration. In practice, the width of the scan, in terms of angle about the rotational axis of the first drum (primary drum) i.e. the horizontal extent of the field of view, (where this axis is vertical) is of the order of 20°. Thus for example in the embodiments of FIGS. 1 and 2, assuming the central "line of sight" of the scanning apparatus to pass orthogonally through the middle of one wall of the primary polygon in one position of the latter at a particular point in time, the corresponding line scan for radiation reflected by the mirror onto that particular wall of the primary drum might commence when the drum is still 10° away from that orthogonal position and terminate when the drum is some 10° past that orthogonal position. Whilst, in the drawings, the primary drum or polygon has been represented as being hexagonal, it should be appreciated that it may be in the form of a polygon with a greater or lesser number of sides, for example it may be of triangular, square or pentagonal form, (with the secondary drum or polygon being, of course, appropriately configured).

As will be appreciated from the above, the invention provides a means of providing, at minimum expense, a two-dimensional "view" of a "scene" viewed in microwave, mm-wave or infrared radiation. Furthermore, the preferred forms of apparatus in accordance with the invention allow such a view to be obtained without excessive duplication of expensive receiving elements and without large and prohibitively expensive lens elements. The preferred embodiments of the invention also offer the advantage of compactness.

The invention claim is:

1. Scanning apparatus operable for radiation in the microwave, mm-wave and infrared ranges and comprising a support structure, a primary drum which is mounted in said support structure for rotation relative to the support structure about a central axis of the primary drum, said primary drum being hollow and internally polygonal to provide a plurality of internally presented sides or facets, which are capable of reflecting the radiation concerned, a radiation director disposed to direct radiation emanating from a field of view of the apparatus, being a field of view which is fixed with respect to said supporting structure, as opposed to rotating with the primary drum, onto the internally presented sides or facets of the primary drum, such that in each of a succession of line scanning periods, as herein defined, radiation emanating from part of said field of view is directed onto a said reflective side or facet of the primary drum to be reflected therefrom onto a further receiving assembly comprising a rotating faceted reflector, herein referred to as a secondary drum, arranged to reflect the radiation striking it from the first drum onto a radiation receiver or sensor, the apparatus being so arranged that the radiation from said field of view is focussed onto said radiation receiver or sensor and wherein said secondary drum is arranged to be rotated, about an axis parallel with the rotary axis of the primary drum, in synchronism with the latter, in such a way that, over said scanning periods, radiation from substantially all of a respective said facet of the primary drum, or from substantially all of a predetermined region of such facet, can reach said receiver or sensor via said secondary drum.

2. Apparatus according to claim 1 wherein said stationary mirror mounted within the primary drum is a focusing mirror.

3. Apparatus according to claim 1 wherein said radiation director includes, in addition to said stationary mirror, a stationary focusing lens mounted within the primary drum.

4. Apparatus according to claim 1 wherein said a radiation director includes a stationary mirror mounted within the primary drum and wherein said reflecting facets of the primary drum are constituted as focussing mirrors.

5. Apparatus according to claim 2 wherein said reflective facets of the primary drum are polarisation-sensitive such that radiation polarised in one sense is able to pass freely through said facets from outside the drum to pass to said stationary mirror and wherein a quarter wave plate or Faraday rotator is located within said hollow primary drum in front of said stationary mirror, whereby the radiation, in passing to the stationary mirror via the quarter wave plate or Faraday rotator, has its polarisation rotated through 45°, the radiation being thereafter reflected from the stationary mirror back through the quarter wave plate or Faraday rotator so as to be polarised in an orthogonal sense to that in which it was admitted through the wall of the hollow primary drum, so that the orthogonally polarised radiation is reflected by a said facet of the primary drum and is reflected thereby onto said secondary drum, to be reflected, in turn, by the latter, onto said receiver or sensor.

6. Apparatus according to claim 1 wherein a meniscus lens with the centre of curvature of its faces lying on said central axis of the primary drum is positioned adjacent said aperture in the focusing mirror so as to intercept the radiation reflected towards the secondary drum from the reflective facets of the primary drum, before such radiation passes through such aperture, and to extend the focus to accommodate said secondary drum and receiver or sensor.

7. Apparatus according to claim 1 wherein a diverging optical element is positioned to intercept the radiation reflected towards the secondary rotary drum from the reflective facets of the primary drum such that, given a beam of radiation reflected from the primary drum and intercepted by said diverging optical element and swinging through a given angle in a given time in correspondence with the scanning action of the apparatus as the primary drum rotates, the corresponding beam leaving the diverging optical element to strike the secondary drum swings through an angle, in said given time, which is a simple fraction of the first mentioned angle, and wherein the rate of rotation of the secondary drum is correspondingly slower than that of the primary drum, and the number of facets on the secondary drum correspondingly greater than in the primary drum.

8. Apparatus according to claim 1 wherein different reflective facets of the primary drum are differently inclined to the rotary axis of the primary drum so that different said facets scan different bands or lines in the field of view, such different lines being substantially parallel with each other but spaced apart perpendicularly with respect to the longitudinal direction of the lines, whereby the apparatus can generate a conventional, TV-type scanning raster as the primary drum rotates, the faces of the secondary polygon being correspondingly inclined with respect to the rotary axis of the secondary drum to remove any deviation of the beam arriving at the receiver or sensor, to ensure that, despite such variations in inclination of the facets of the primary drum, the beam of radiation arriving at arriving at the receiver or sensor does so with a fixed orientation.

9. Apparatus according to claim 1 wherein the picture information for at least two different lines of the scanned image is provided by respective radiation receivers or sensors spaced apart in a direction perpendicular to the direction of line scan, and each receiving radiation from a respective elevation in the field of view relative to said support structure.

10. Apparatus according to any preceding claim wherein the picture information for each line of the scanned image is provided by a respective radiation receiver or sensor in an array of such receivers or sensors, each receiving radiation from a respective elevation in the field of view relative to said support structure.

* * * * *